No. 847,947. PATENTED MAR. 19, 1907.
D. T. KENNEY.
APPARATUS FOR REMOVING DUST.
APPLICATION FILED NOV. 29, 1901.
5 SHEETS—SHEET 1.
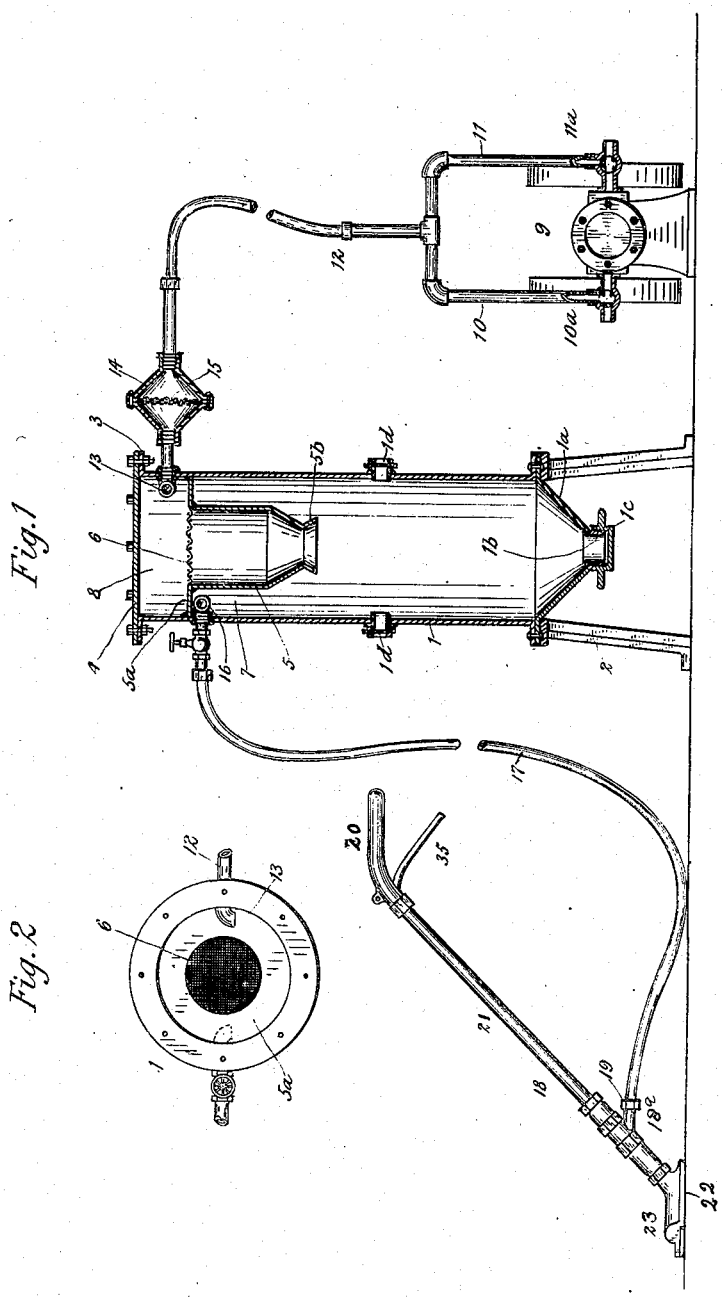
Witnesses:
Edward J. Murphy
Geo. L. Wheelock
Inventor:
David T. Kenney.
by Thomas Ewing Jr.
Attorney No. 847,947. PATENTED MAR. 19, 1907.
D. T. KENNEY.
APPARATUS FOR REMOVING DUST.
APPLICATION FILED NOV. 29, 1901.
5 SHEETS—SHEET 2.
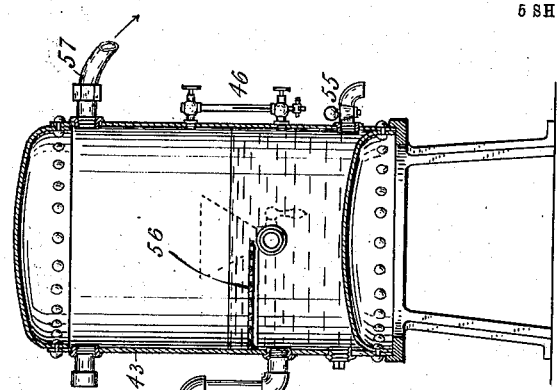
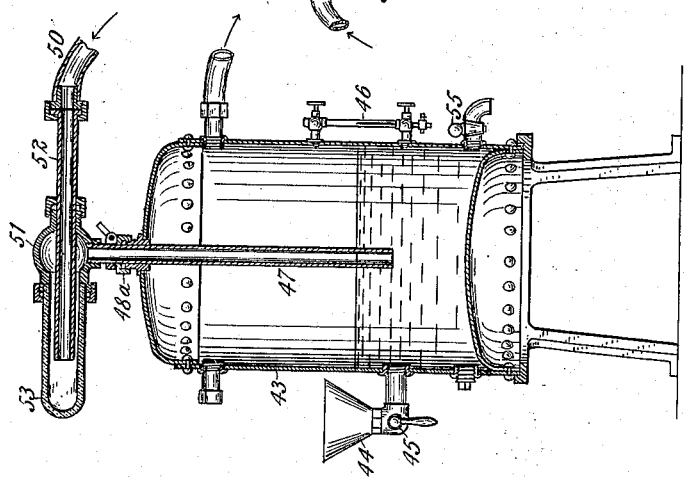
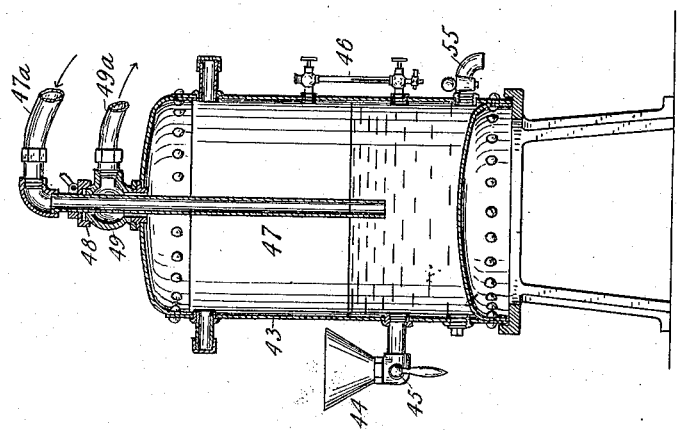
Witnesses:
Edward J. Murphy
Geo. L. Wheelock
Inventor:
David T. Kenney
by Thomas Ewing Jr.
Attorney.

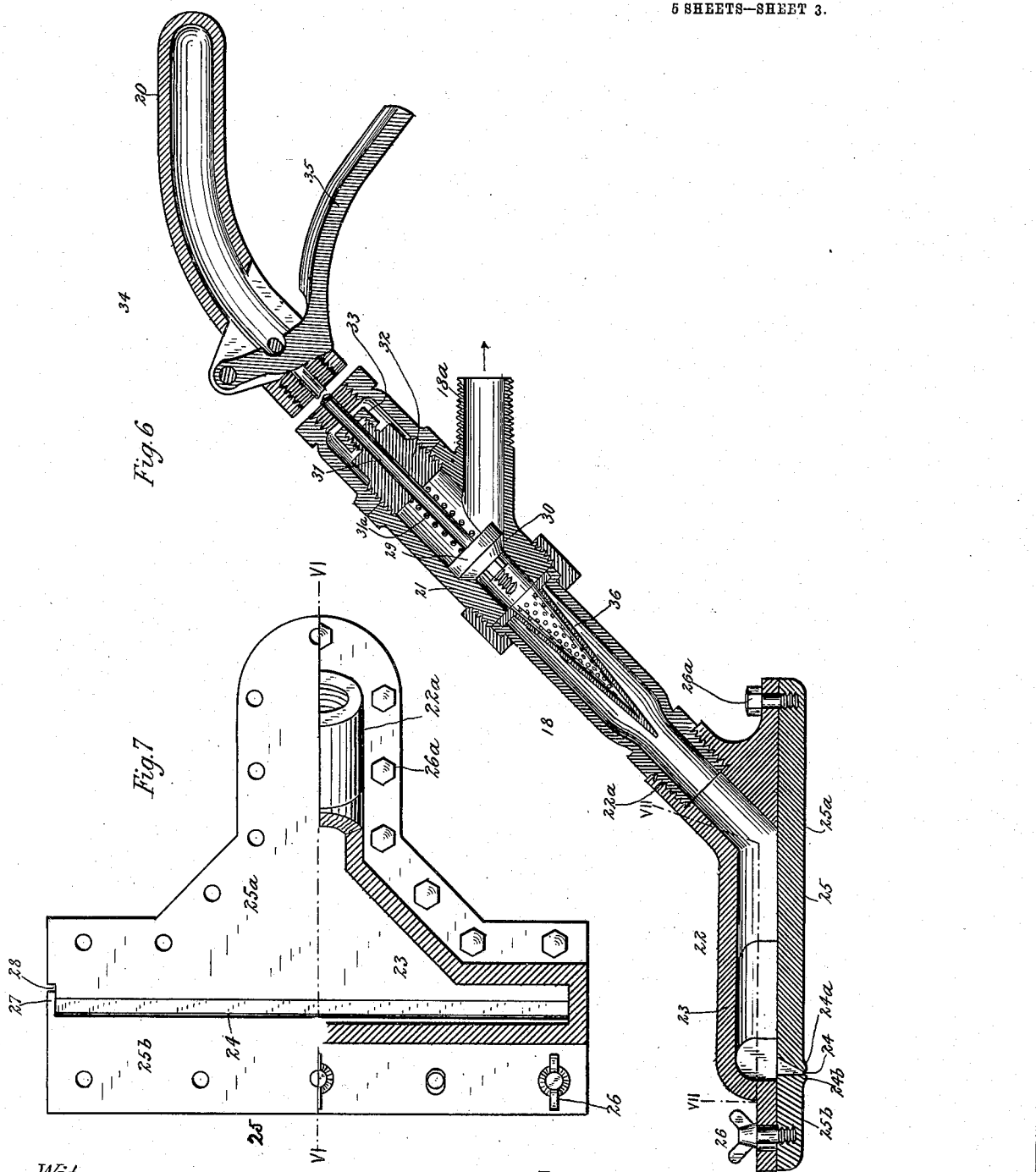

No. 847,947. PATENTED MAR. 19, 1907.
D. T. KENNEY.
APPARATUS FOR REMOVING DUST.
APPLICATION FILED NOV. 29, 1901.
5 SHEETS—SHEET 4.
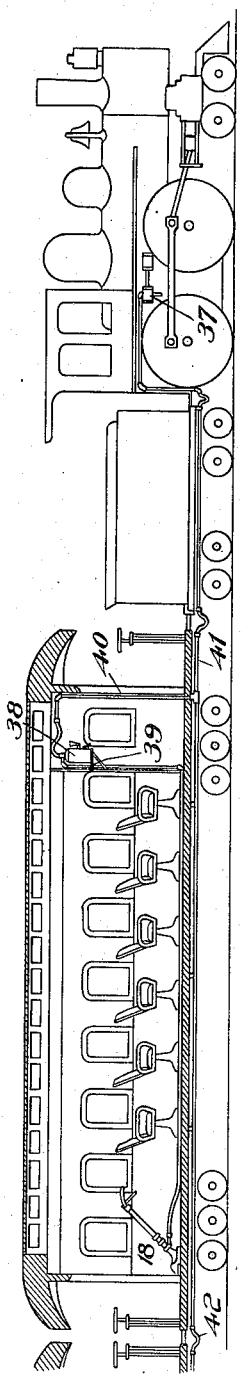
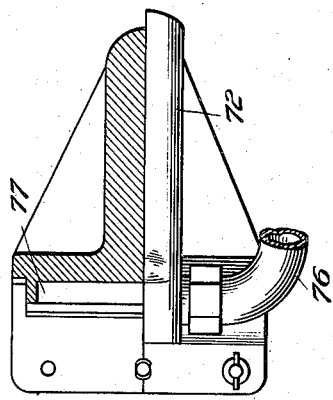
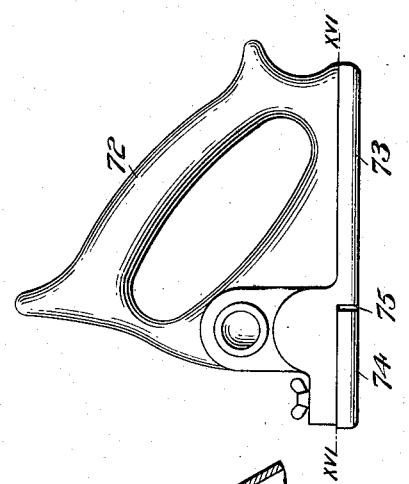
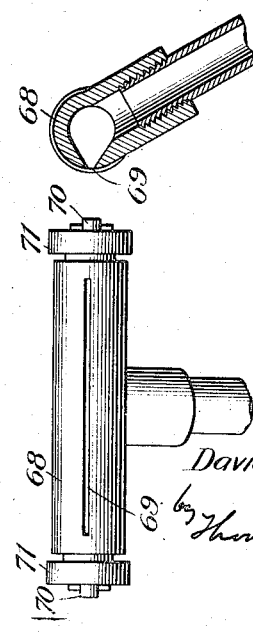
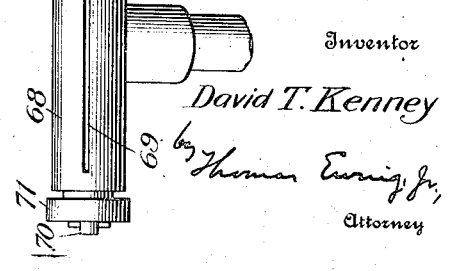
Witnesses
Edwin L. Bradford
T. H. Dorsey
Inventor
David T. Kenney
by Thomas Ewing, Jr.,
Attorney No. 847,947. PATENTED MAR. 19, 1907.
D. T. KENNEY.
APPARATUS FOR REMOVING DUST.
APPLICATION FILED NOV. 29, 1901.
5 SHEETS—SHEET 5.
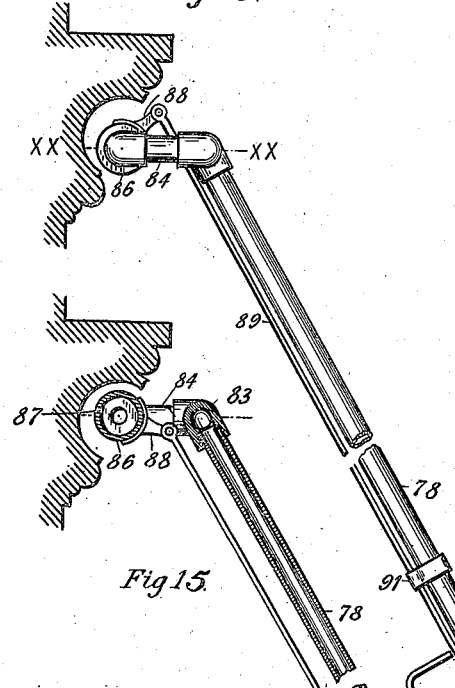
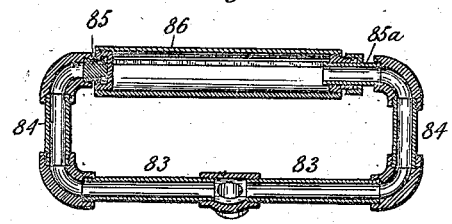
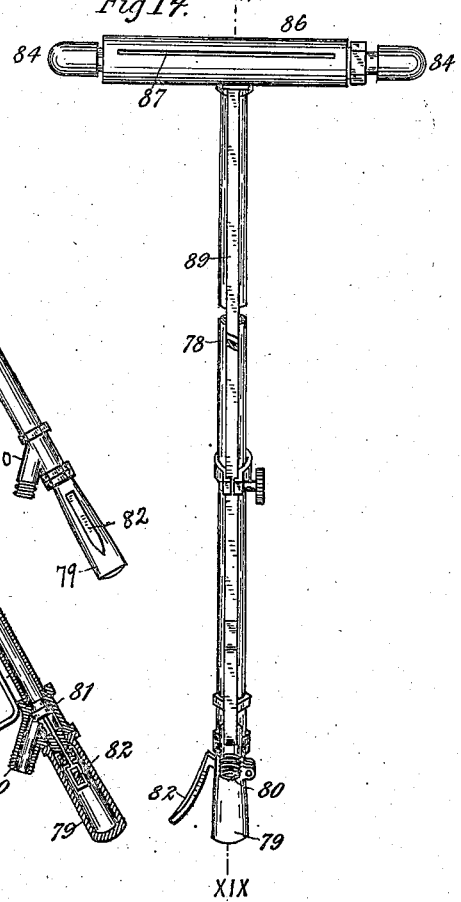
Witnesses:
Edward J. Murphy.
Geo. L. Wheelock
Inventor:
David T. Kenney
by Thomas Ewing, Jr.,
Attorney

UNITED STATES PATENT OFFICE.

DAVID T. KENNEY, OF NORTH PLAINFIELD, NEW JERSEY, ASSIGNOR TO VACUUM CLEANER COMPANY, OF NORTH PLAINFIELD, NEW JERSEY, A CORPORATION OF NEW JERSEY.

APPARATUS FOR REMOVING DUST.

No. 847,947.　　　Specification of Letters Patent.　　　Patented March 19, 1907.

Application filed November 29, 1901. Serial No. 84,058.

*To all whom it may concern:*

Be it known that I, DAVID T. KENNEY, a citizen of the United States of America, and a resident of the borough of North Plainfield, in the county of Somerset and State of New Jersey, have invented certain new and useful Improvements in Apparatus for Removing Dust, of which the following is a specification.

This invention relates to apparatus for removing dust from surfaces such as floors, walls, and ceilings of dwelling-houses, office-buildings, factories, and warehouses, book-cases, and shelves and books or for removing dust from objects or articles, as carpets, rugs, furniture, clothing, passenger-coaches, sleeping-cars, drawing-room cars, &c.

The object of the invention is to provide an apparatus by which the cleaning or removing of dust may be accomplished with ease and despatch and to practically clean any suitable surface, object, or article from every adhering particle of dust or dirt which can be removed.

In the present invention suction is utilized, so that the dust or dirt is sucked into the apparatus and entirely removed from the compartment or room in which the dust was originally. The apparatus employed comprises in combination a suction-nozzle adapted to be moved over the surface to which it is applied for cleaning and having a narrow inlet-slot, a suction-creating device capable of maintaining a sufficient vacuum, and impurities-collecting means between the nozzle and suction-creating device and suitably connected therewith for removing the impurities from the air. When the apparatus is employed for cleaning carpets or other fabrics, the air is forced to penetrate the fabric at the suction-nozzle, whereby the dust is removed from the body of the fabric as well as from the surface without subjecting the fabric to any mechanical action that will wear it away.

In the accompanying five sheets of drawings, Figure 1 is an elevation of one form of apparatus for cleaning or removing dust constructed in accordance with my invention, the separator, in which the particles of dust and dirt settle, being shown in section. Fig. 2 is a plan view of the separator with its top plate removed. The separator shown in these two views is a dry separator. Fig. 3 is a vertical central section, parts in elevation, of one form of wet separator. Figs. 4 and 5 are similar sections of still other forms of wet separators. Fig. 6 is a longitudinal section on line VI VI, Fig. 7, of the hand implement which is preferably used similarly to a carpenter's plane, flat-iron, mop, brush, or broom. Fig. 7 is a view showing the head or shoe of the implement which is applied to the object to be cleaned, one half of the same being in section on the line VII VII of Fig. 6, while the other half is in plan. Fig. 8 is a sectional elevation showing the apparatus applied to a railway-car. Figs. 9 and 10 are respectively a plan and a transverse section showing a modification of the head or shoe of the hand implement. Fig. 11 is a side elevation of another modification simulating a flat-iron or a carpenter's plane. Fig. 12 is a half-section and a half-plan of Fig. 11, the section being on line XVI XVI of said figure. Figs. 13 and 14 are a side elevation and a plan of a modified form of hand implement shown in use upon moldings or cornices. Fig. 15 is a longitudinal section on the line XIX XIX of Fig. 14, and Fig. 16 is a section on the line XX XX of Fig. 13.

Referring to the drawings, Figs. 1 and 2, a separator is shown consisting of a preferably cylindrical casing or shell 1, which is supported on suitable legs or standards 2 and which is provided with a top flange 3, to which is bolted or otherwise suitably secured a removable top 4. A suitable funnel-shaped baffle 5 is supported in depending position within the upper part of the casing 1 by means of an annular flange $5^a$, which is suitably secured, as by riveting or soldering, to the casing 1. The lower portion of the funnel is preferably constructed so as to provide a flaring mouth $5^b$, while across the open upper end of the funnel is preferably secured a suitable screen 6, made in any suitable manner to provide openings or perforations. An annular space 7 is formed around the funnel, while another space or chamber 8 is formed above the funnel. The bottom $1^a$ of the casing is made to taper downwardly and is provided with a screw-threaded neck $1^b$, to which is applied a suitable screw-cap or closure $1^c$, so that dust or dirt which accumulates in the separator may be removed therefrom.

A suction or air pump 9 is arranged at a suitable point and is connected, by means of branch pipes 10 11, with a suction-pipe 12, said branch pipes 10 11 leading to opposite sides of the air-chamber of the pump, so that by the manipulation of suitable valves 10$^a$ 11$^a$ the pump may be utilized either as a suction or (for the purpose stated below) as a compression-pump. The pipe 12 leads, by means of an intake-mouthpiece 13, into the upper chamber 8 of the separator and is provided with a chamber 14, in which is located a suitable screen 15. The mouthpiece 13 of the suction-pipe 12 is directed laterally, while at the opposite side of the casing and below the flange 5$^a$, supporting the funnel, is also a laterally-directed outlet-mouthpiece 16 of a flexible tubing or hose 17 or other suitable pipe, which is connected with a hand or equivalent implement 18. The hose 17 is preferably provided with a screw-coupling 19, which screws onto a screw-threaded neck 18$^a$ (see Fig. 6) on the hand implement 18.

The construction of one form of hand implement or cleaner is shown in detail in Fig. 6 and 7. Said hand implement is provided with a suitable handle 20 beyond the neck 18$^a$ and with a stock 21, which is composed of screw-threaded and coupling sections of tubular form, that are in turn connected by a screw-coupling with the head or shoe 22 of the implement. The head 22 is composed of a chambered top part 23, the chamber of which top part is connected, on the one hand, with the passage through the tubular stock 21, while, on the other hand, it is broadened or laterally extended so as to communicate with an elongated slot 24, formed transversely in the flat bottom plate 25. The slot is restricted and narrow, and the bounding and defining lips thereof are so disposed that the outward mouth of the slot lies in what, when the cleaner is in use constitutes the contact-surface of the implement, so that it will hug the surface to be cleaned. As illustrated in Figs. 6 and 7, the bottom plate is attached by set-screws 26 26$^a$ to the top portion 23. It is evident, however, that these parts may be cast in one piece. Said bottom plate is formed flat, so as to slide or glide along a flat surface, and is preferably constructed of sections 25$^a$ 25$^b$, respectively, the rear section 25$^a$ being fixed in one position to the top part 23, while the front section or strip 25$^b$ is adjustable, the slot 24 being formed between the adjoining edges of the bottom sections 25$^a$ 25$^b$. By adjusting the front or toe section 25$^b$ of the bottom plate to or from the section 25$^a$ the slot may be narrowed or widened, according to the work required. The dust or dirt which is to be removed is sucked through the slot 24, and for the purpose of getting at the parts to be cleaned or dusted more readily, as well as to get into cracks or crevices, the slot, where the shoe has a flat bottom of considerable extent, may be provided with projecting lips 24$^a$ 24$^b$, formed, respectively, on the bottom sections 25$^a$ 25$^b$. The slot is closed at each end by means of lugs or rearward projections 27, which are located at each end of the adjustable bottom section 25$^b$, said lugs being received and guided in recesses 28 in opposite side edges of the broad bottom section 25$^a$. By means of a screw connection 22$^a$ of the head or shoe 22 with the stock 21 different forms and constructions of heads or shoes may be applied to said stock.

Suction is exerted on the implement through the neck 18$^a$, and for the purpose of applying or shutting off the suction the implement 18 is provided with a valve 29, which seats against a valve-seat 30, formed in the stock 21 between the neck 18$^a$ and the head or shoe. Said valve is carried by a valve-stem 31, which is guided in a guide-piece 32, screwed into the stock 21 and provided with a stuffing-box 33, so as to pack the joint at this point. The valve-stem 31 is engaged at 34 by means of a pivoted hand-lever 35, which is located adjacent the handle 20 of the implement, so that when the operator grasps the handle the hand-lever 35 may be simultaneously grasped and moved toward the handle 20, thereby opening the valve 29 against the closing tendency of its actuating-spring 31$^a$. A conical screen 36 is removably secured in the hollow stock 21 and points toward the shoe or head 22. The function of this screen 36 is to prevent the suction of large pieces of material, such as splinters and other matter liable to clog up the apparatus, into the pipe leading to the separator 1.

When the pump 9 is operated, so as to create a suction on the apparatus, and an operator grasping the handle of the hand implement 18 applies the head or shoe to a floor, wall, or ceiling, or other surface, the particles of dust or dirt which come within the influence of the suction which is exerted through the slot 24 are sucked through the implement and through the implement hose or pipe 17 without going through the handle, the dust-laden air discharging into the annular space 7 around the funnel 5 of the separator. Suction is exerted on the separator by the mouthpiece 13 of the pump-pipe 12, and in view of the location of the orifices of the mouthpieces 13 16 and also of the relative location of the funnel 5 a whirling or curvilinear motion is imparted to the air, and as the section of the funnel is of greater area than the opening of the mouthpiece 16 the air is rarefied in the separator, so that the dust or other particles become relatively heavier. As the whirling or curvilinear motion imparted to the air within the large chamber of the separator lengthens out the path of the air-current, as it were, this, in connection with the fact that the air in the casing of the separator is rarefied and the suction action is less therein than in the pump-pipe, permits practically all the dust suspended in the dust-laden air sucked through the outlet-mouthpiece 16 of implement-pipe 17 to gravitate and drop onto the bottom 1ª of the separator, the suction through the enlarged orifice 5ᵇ of the funnel not being sufficient to overcome the gravitating tendency of the dust particles. As a further guard against the sucking of any particles of dust through the intake-mouthpiece 13, the screen 6 at the upper end of the funnel is preferably provided. Should, however, any particles find access into the intake-mouthpiece 13, they will be intercepted by the screen 15. The air discharged from the pump is directed to any suitable point. When the casing 1 is filled with dust or dirt to a practicable point—say opposite or below the peep-holes 1ᵈ—the action of the pump is interrupted and the screw-cap 1ᶜ of the separator removed. The dust and dirt may be discharged therefrom, as from a hopper, into a suitable receptacle. After this has been done the screw-cap is replaced and the action of the apparatus is resumed. By reversing the action of the pump 9 air may be forced through the apparatus, so as to clean the screens 15 6 36 from adhering particles. It is evident that the head or shoe, or its equivalent, may be stationary and the object to be cleaned moved across it.

One application of an apparatus constructed in accordance with my invention is shown in Fig. 8, where a railway-car is shown. In this device a suction-pump 37 is arranged, preferably, on the engine at a suitable point, so as to get steam from the boiler. The separator 38 shown here is a wet separator, to be hereinafter described, and is supported on a shelf 39 at a suitable point in the car, it being connected, by means of a branch pipe 40, with a train-line pipe 41, which leads to the suction-pump 37. The train-line pipe 41 is arranged in sections, one for each car, connected by couplings 42, the same as with an air-brake. The hand implement 18 is the same as described heretofore. By this means a whole train of cars or anything contained therein may be cleaned, as each car is equipped with a special separator and a suitable hand implement.

Figs. 3, 4, and 5 show various forms of wet separators, consisting of casings or tanks 43, provided with funnels 44 for filling casings 43 with water or other suitable liquid, said filling-funnels being each controlled by stop-cock 45. Water-gages 46 indicate the height of the water in the casing 43. In Figs. 3 and 4 dip-tubes 47 are shown, the same being inserted through suitable stuffing-boxes 48 48ª, respectively, at the top of the casing, so as to dip into the water therein. By inserting the tubes 47 into the water the liquid surface in contact with the dust-laden air is increased. In this way the dust is carried directly into the liquid and precipitated therein. The said tubes 47 are not fixed permanently to the casing, but may slide in their stuffing-boxes, so as to be adjustable according to the height of the water in the casing. In Fig. 3 the tube 47 is connected, by means of suitable hose or other pipe 47ª, as in Fig. 1, with the hand implement or corresponding part. (Not shown.) In this figure the stuffing-box 48 is arranged on a neck 49 at the top of the casing, which neck is connected by a flexible or other suitable pipe 49ª with the suction-pump. In Fig. 4 the branch pipe 50, which leads to the hand implement or corresponding part, is connected with a head 51 by a tube 52, which has a sliding connection with the head 51, into which it is inserted. The inner end of the tube 52 is inserted into a tubular glass 53, closed at one end, and at the other end coupled to the head 51, so that it may be used for the purpose of demonstration in observing the quantity of dust sucked through the tube 52. In Fig. 5 the pipe leading from the hand implement is connected by a gooseneck 54 with the casing. This gooseneck prevents the water from finding its way into the hand implement. A transverse perforated baffling-plate 56 is suitably secured in the casing at a point above the outlet end of the gooseneck 54, so that the dust-laden bubbles of air apt to occur will be broken up and the danger of any dust being carried into the pump-pipe 57 minimized. In the liquid-chamber of the wet separator the water or other liquid therein becomes charged with dust and dirt, and then at the desired moment the dirty liquid is permitted to flow off through the faucet 55. Should such an interval of time elapse that the dust and dirt will settle in the bottom of the casing of such a separator, as shown in these figures, so as to form a deposit therein which would not of itself flow off through the faucet 55, the action of the pump is reversed, so as to force compressed air into the separator 43, thereby squirting the deposit out or blowing it through the faucet 55.

Each form of separator shown acts as a suction reserve and equalizer, for the reason that a partial vacuum is created in the air-chamber above the liquid, causing a constant and practically uniform suction on the dust-inlet head or shoe whatever may be the variations due to friction or other possible disturbances in the pump-pipe or attached parts.

In Figs. 9 and 10 another form of head or shoe is shown, the same being T-shaped, the chambered cross-piece 68 of which is provided with a slot 69. At opposite sides of the head journals 70 are provided, on which are mounted rollers 71, so that the hand implement may be easily rolled back and forth over the surface to be cleaned.

In the form shown in Figs. 11 and 12 the device resembles a flat-iron or carpenter's plane in that it is provided with a hand-grip 72, which is equipped with a flat bottom plate or section 73, having an adjustable section 74, as in the main form of the hand implement, so that the slot 75 may be adjusted according to requirements. The suction-tube 76 is in this case preferably attached to one side of the hand-grip 72, which is hollow at this point, as at 77, so as to provide a chamber, as indicated in Fig. 12. This form of the hand implement is very desirable where small objects are to be cleaned, as desks, sofas, and other office or parlor furniture, and this form of the invention could also be utilized to advantage in cleaning dust from books, file-boxes, &c.

In the form shown in Figs. 13 to 16 the device is peculiarly adapted for getting into recesses or corners of moldings, cornices, or other similar work. Here an elongated tubular stock 78 is provided, having at one end a handle 79 and adjacent thereto a neck 80, which is connected with the suction-pipe. A valve 81, operated by means of a hand-lever 82 adjacent to the handle of the stock, controls the suction through the implement. At the opposite end of the stock 78 are arranged branch pipes 83, provided with return-bends 84, and constructed at their inwardly-presented ends with journals 85 85ª, on which is journaled a tubular head or shoe 86, that turns on its longitudinal axis, so that a longitudinal slot 87, which lies in the contact-surface of the head or shoe, may be moved to the desired point by the rotation of the said head or shoe. This turning movement of the tubular head or shoe 86 may be accomplished by means of a crank 88 thereon, which is connected with an operating-rod 89, having a handle 90 and guided longitudinally of the stock by a guide-eye 91, located on the stock. By operating the slide-rod so as to turn the tubular head or shoe the slot therein is presented at various points in the recess of a cornice or molding to be cleaned, so that all of the dust or dirt therein may be removed by the suction exerted on the implement.

Where hand implements are used as such, the handles may be of various construction. Of course the separators may be made and sold separately from the rest of the apparatus.

It is evident that other forms of hand or other implements or equivalent parts may be provided which are peculiarly adapted for special work, and it is also evident that various forms of separators may be employed and other changes may be made in the apparatus without departing from the spirit and scope of the invention.

In my Patent No. 739,263, dated September 15, 1903, and filed February 8, 1902, as a division of this application, (wherein this application is referred to and wrongly stated to have been filed November 21,) I have claimed the dry separator herein shown; in my Patent No. 807,283, dated December 12, 1905, and filed February 8, 1902, as a division of this application, (with like wrong reference to its date of filing,) I have claimed the wet separator herein disclosed; in an application Serial No. 263,344, filed June 1, 1905, as a division of this application, I have claimed the means for observing dust-laden air-currents disclosed in this application and illustrated in Fig. 4, and in my application filed as a divisional application of this application, December 28, 1906, Serial No. 349,881, I claim the cleaner with adjustable slot.

What I claim as new and of my invention is—

1. In a suction-cleaning apparatus, the combination of a suction-nozzle adapted to be moved over the surface to which it is applied for cleaning and having a narrow inlet-slot, a suction-creating device capable of maintaining a sufficient vacuum, and impurities-collecting means between the nozzle and the suction-creating device and suitably connected therewith for removing the impurities from the air, substantially as described.

2. In an apparatus for removing dust or dirt, the combination of a suction-creating device capable of maintaining a sufficient vacuum, an inlet head or shoe having an unobstructed elongated slot and so constructed that the edges of the slot may be brought into contact with the surface of the object to be cleaned, and a separator intermediate of and suitably connected with the suction-creating device and the inlet head or shoe for removing the dust from the air, substantially as described.

3. In a suction-cleaning apparatus, the combination of a suction-nozzle adapted to be moved over the surface to which it is applied for cleaning and having a narrow inlet-slot, a power-operated suction-pump, and impurity-collecting means between said nozzle and pump adapted to remove the impurities from the air and prevent fouling the pump while permitting the working vacuum to be maintained at the nozzle, substantially as described.

4. A cleaner comprising a suction-chamber, provided with a narrow inlet-slot, the slot being bounded and defined by lips which lie in the contact-surface of the cleaner, with the outward mouth of the slot lying in the plane of this contact-surface, substantially as described.

Signed at New York, N. Y., this 26th day of November, 1901.

DAVID T. KENNEY.

Witnesses:
THOMAS EWING, Jr.,
GEO. L. WHEELOCK.

DISCLAIMER.

847,947.—*David T. Kenney*, North Plainfield, N. J. APPARATUS FOR REMOVING DUST. Patent dated March 19, 1907. Disclaimer filed November 19, 1915, by the assignee, *Vacuum Cleaner Company*.

Enters this disclaimer—

"To that part of the claim in said specification, being claim 2 thereof, which is in the following words to wit:

"In an apparatus for removing dust or dirt, the combination of a suction-creating device capable of maintaining a sufficient vacuum, an inlet head or shoe having an unobstructed elongated slot and so constructed that the edges of the slot may be brought into contact with the surface of the object to be cleaned, and a separator intermediate of and suitably connected with the suction-creating device and the inlet head or shoe for removing the dust from the air, substantially as described."

[ *Official Gazette*, December 7, 1915.]